July 26, 1927.

J. KIRCHENSTEINER

MOTOR BRAKE FOR AUTOS

Original Filed Nov. 13, 1923

1,637,118

WITNESSES

INVENTOR
Johann Kirchensteiner

Patented July 26, 1927.

1,637,118

UNITED STATES PATENT OFFICE.

JOHANN KIRCHENSTEINER, OF WETZIKON, SWITZERLAND.

MOTOR-BRAKE FOR AUTOS.

Original application filed November 13, 1923, Serial No. 675,752, and in Germany May 29, 1923. Divided and this application filed February 17, 1925. Serial No. 9,891.

My invention relates to a motor brake for autos and has for its object the regulation of the resistance which the motor brake develops. This application is a division of application Serial Number 675,752 filed Nov. 13, 1923.

Reference is to be had to the accompanying drawing, in which

Fig. 1 is a cylinder section with closed exhaust valve.

Figs. 2 and 2ª are cylinder sections with open exhaust valves.

Figure 1:
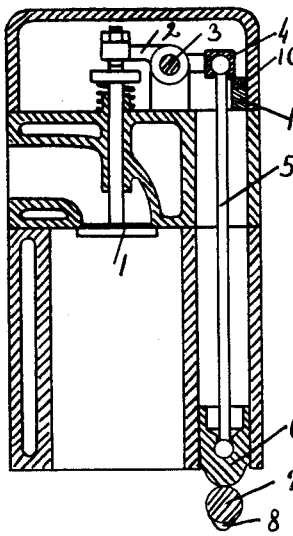
Figure 3:
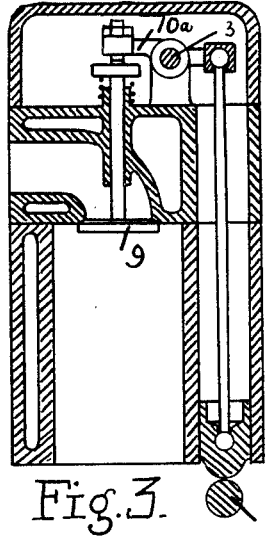
Fig. 3 is a cylinder section with closed inlet valve.

According to Figure 1 the motor works as a power engine. Therefore the exhaust valve 1 is operated by the cam 8 of the cam shaft 7. The shifter 6 operates the lever 2, which is pivoted at 3. According to Figure 3 the inlet valve 9 is opened by the lever 10ª, which is pivoted at 3.

Figure 2:
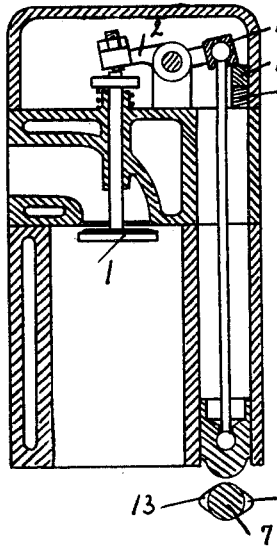

While in Fig. 1 the motor works as a power engine, the motor acts as a motor brake according to Figure 2. In the latter the auxiliary cams 13, 14 of cam shaft 7 operates the exhaust valve, which is shown in a open position in Figure 2. At first it should be explained how the motor brake acts and how the motor is changed into the motor brake. If the motor acts as a power engine according to Figure 1, the cam 8 opens the exhaust valve 1 and another cam operates the inlet valve 9. (The cam is not shown.) As soon as the motor should act as a motor brake the cam shaft 7 is shifted lengthwise and the cam 8 is put out of work and also the cam for the inlet valve 9. Now the auxiliary cams 13, 14 work. Therefore the motor works as a compressor in the following way.

The inlet valve 9 does not work at all, but the exhaust valve 1 acts now as the air inlet valve. When the piston goes downward the cam 13 opens the valve 1 and air is sucked into the cylinder. When the piston goes upward, the air will be compressed and develops a high resistance. Near the upper dead point the valve 1 is opened by cam 14 and the compressed air rushes into the atmosphere. Going downward the valve 1 is kept open by the cam 14 and the air is sucked into the cylinder. Going upward the air is compressed again. As soon as the air is compressed, it develops always a high resistance and acts as a brake. All cylinders of the motor can act as a motor brake. In case all cylinders develop a too high resistance, it would be desirable to reduce the latter. Therefore in one or several cylinders no resistance should be developed, this is reached by keeping the valve 1 always open. For this reason the arrangements of Figures 5–8 are applied, which will be explained later.

Figure 4:
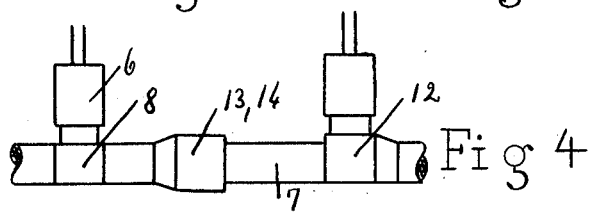
Fig. 4 is a part of the cam shaft.
Figure 2A:
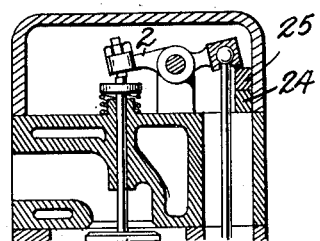

Fig. 4 shows a part of the cam shaft fitted with the regular cams for the motor and auxiliary cams. The cams are flattened against the cam shaft, so that the shifter 6 can slide very easily over the cams as soon as the cam shaft is shifted lengthwise. The exhaust valve cam 8 operates the exhaust valve and cam 12 the suction valve, when the motor is working as a power engine. When the motor acts as a brake the cams 8, 12 leave their place and the auxiliary cams 13, 14 take the place of cam 8.

As mentioned above it is necessary to reduce the resistance in case that the motor works as a motor brake. For this reason according to Figures 5 and 6 a movable slide 10 is applied, which carries the shoulders 30, 31, 32, 33. These shoulders are able to catch the outside part 4 of the exhaust levers 2, after each other. The arrangement works in the following way.

If the cylinder should work as a compressor, the cam shaft 7 is shifted lengthwise. All cams, which operate the inlet and exhaust valves don't work any more, but the auxiliary cams operate the exhaust valves, while the inlet valves don't work. Each cylinder works, as it is described above, as a compressor and therefore it acts as a brake. In case the total resistance is too high and it is desired the first cylinder should not work and should not act as a brake, the slide 10 is shifted forward. As soon as the outside part 4 of the exhaust lever 2 is lifted, the shoulder 30 is shifted forward and catches the part 4 so that the lever 2 cannot go back in its first position. If the resistance is still too high, the first and second cylinder should not work as a brake. Therefore, as soon as the exhaust lever of the second cylinder is lifted, the slide 10 is shifted forward and the outside part 15 of the second exhaust lever is caught. If necessary all the other cylinders can be put out of work under the same conditions.

Figure 5:
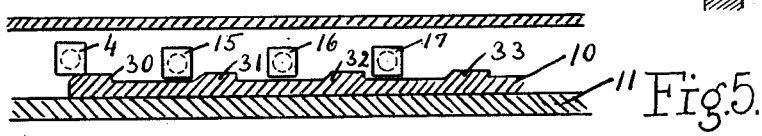
Figs. 5–8 show an arresting arrangement for keeping the valve lever in a lifted position.
Figure 6:
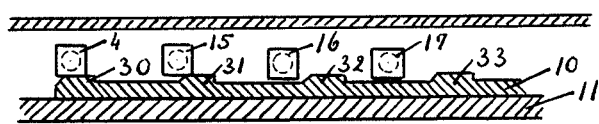
Figure 7:
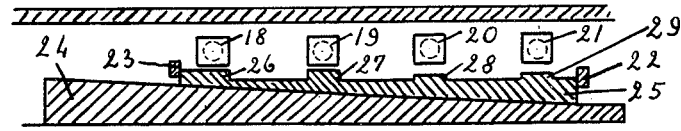
Figure 8:
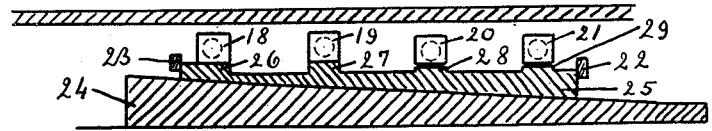

According to the Figures 7 and 8 the arrangement works similar to the construction of the Figures 5 and 6 but in the present case the arrangement makes it possible that each cylinder can offer more or less resistance. A plate 25 rests on a wedge-shaped slide 24 and by moving the wedged shaped slide 24 to the right the plate 25 with the shoulders 26, 27, 28, 29 is lifted. The plate 25 is guided between the bearings 22, 23, so that it cannot move sidewise.

As the Figure 2ª shows, the wedge-shaped slide 24 and plate 25 are arranged just in the same way as the slide 10 and plate 11 in Figure 2.

The arrangement works as follows:

In case the resistance of the motor brake is too high, the wedge-shaped slide 24 is shifted to the right side and the outside part 18 of the exhaust lever of the first cylinder is caught. By shifting the wedge-shaped slide 24 further to the right, the next exhaust lever 19 is caught. In case that the resistance of the second cylinder should be reduced only a little bit, the lever 19 is lifted by the plate 25 and the wedge-shaped surface of the slide 24 only a certain amount so that the exhaust valve is opened only a certain part. As the air rushes into the cylinder, it cannot move in and out freely and therefore only a certain resistance arises. The levers 20, 21 are caught by the nozzles 28, 29 under the same conditions as mentioned above.

I claim—

The combination in an explosion engine, comprising an exhaust valve, a cam to actuate said valve while the engine is operating as a motor, auxiliary cams adapted to in turn actuate the exhaust valve to make said engine act as brake, plate with offsets catching the exhaust levers so that the exhaust valves cannot be closed if decreasing resistance is required, a wedge-shaped slide as rest for the plate for the purpose of regulating the resistance of one cylinder.

In testimony whereof I affix my signature.

JOHANN KIRCHENSTEINER.